(12) United States Patent
Dubin et al.

(10) Patent No.: US 7,145,611 B2
(45) Date of Patent: Dec. 5, 2006

(54) SEAMLESS TILED DISPLAY SYSTEM

(75) Inventors: Matthew B. Dubin, Scottsdale, AZ (US); Brent D. Larson, Cave Creek, AZ (US); Aleksandra Kolosowsky, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 417 days.

(21) Appl. No.: 09/746,739

(22) Filed: Dec. 22, 2000

(65) Prior Publication Data
US 2002/0080302 A1    Jun. 27, 2002

(51) Int. Cl.
G02F 1/133    (2006.01)

(52) U.S. Cl. ............................................. 349/5; 349/73

(58) Field of Classification Search .................... 349/5, 349/73; 353/30, 94; 358/482, 483; 359/254, 359/263, 622, 318, 435
See application file for complete search history.

(56) References Cited

U.S. PATENT DOCUMENTS

| | | | |
|---|---|---|---|
| 4,257,041 A | 3/1981 | Masucci | |
| 4,365,869 A | 12/1982 | Hareng et al. | |
| 4,735,495 A | 4/1988 | Henkes | 303/345 |
| 5,576,725 A | 11/1996 | Shimada | |
| 5,598,281 A * | 1/1997 | Zimmerman et al. | 349/5 |
| 5,626,410 A | 5/1997 | Chambers et al. | 353/94 |
| 5,661,531 A | 8/1997 | Greene et al. | 349/73 |
| 5,777,782 A * | 7/1998 | Sheridon | 359/296 |
| 5,805,117 A | 9/1998 | Mazurek et al. | 345/1 |
| 5,847,784 A | 12/1998 | Finnila et al. | 349/73 |
| 5,902,033 A | 5/1999 | Levis et al. | 353/122 |
| 6,005,649 A | 12/1999 | Krusius et al. | 349/73 |
| 6,014,232 A * | 1/2000 | Clarke | 358/482 |
| 6,097,455 A | 8/2000 | Babuka et al. | 349/73 |
| 6,104,447 A | 8/2000 | Faris | 349/5 |
| 6,115,092 A | 9/2000 | Greene et al. | 349/74 |
| 6,124,974 A | 9/2000 | Burger | 359/621 |
| 6,128,054 A * | 10/2000 | Schwarzenberger | 349/73 |
| 6,337,724 B1 * | 1/2002 | Itoh et al. | 349/75 |
| 6,540,363 B1 * | 4/2003 | Steffensmeier | 353/31 |
| 6,611,241 B1 | 8/2003 | Firester et al. | |

FOREIGN PATENT DOCUMENTS

| | | |
|---|---|---|
| EP | 0777389 A | 6/1997 |
| EP | 1118901 A | 7/2001 |
| FR | 2607301 A | 5/1968 |

\* cited by examiner

*Primary Examiner*—Andrew Schechter
*Assistant Examiner*—Richard Kim
(74) *Attorney, Agent, or Firm*—Ingrassia Fisher & Lorenz (57) ABSTRACT

A modular and scalable seamless tiled display apparatus includes multiple display devices, a screen, and multiple lens assemblies. Each display device is subdivided into multiple sections, and each section is configured to display a sectional image. One of the lens assemblies is optically coupled to each of the sections of each of the display devices to project the sectional image displayed on that section onto the screen. The multiple lens assemblies are configured to merge the projected sectional images to form a single tiled image. The projected sectional images may be merged on the screen by magnifying and shifting the images in an appropriate manner. The magnification and shifting of these images eliminates any visual effect on the tiled display that may result from dead-band regions defined between each pair of adjacent sections on each display device, and due to gaps between multiple display devices.

31 Claims, 9 Drawing Sheets

SEAMLESS TILED DISPLAY SYSTEM

STATEMENT REGARDING FEDERALLY SPONSORED RESEARCH OR DEVELOPMENT

This invention was made with Government support under contract NAS1-20219 awarded by NASA. The Government has certain rights in this invention.

FIELD OF THE INVENTION

The present invention generally relates to the field of displays, and more particularly relates to seamless tiled display systems including multiple display devices (i.e., tiles) tiled together via projection to produce a larger and/or higher-resolution image.

BACKGROUND

Many types of displays are commercially available in a variety of sizes and resolutions. These known types of displays include flat-panel displays (FPDs), such as liquid crystal displays (LCDs), plasma displays and organic light-emitting diode (OLED) displays, and non-FPDs, such as cathode ray tube (CRT) displays and projection displays.

While many applications are well served by these existing displays, there are other applications with size and resolution requirements that are not met by any single display. Such higher-end applications are likely to become more common due to the convergence of a variety of computational and information technologies that are creating an increasing need for larger, higher-resolution displays which are capable of effectively displaying large amounts of information. Unfortunately, various factors make it impractical to simply adapt existing display technologies to meet the needs of such higher-end display applications. For example, the size and resolution of LCDs are both limited by manufacturing and yield issues, and by the need to provide control signals to each pixel within the LCD. Because of the limits on the size and resolution of existing displays, the ability to design larger and higher-resolution displays to effectively present large amounts of information is limited.

Attempts have been made to produce larger and higher-resolution displays by combining smaller display tiles together to form tiled display systems. For example, one known type of tiled display system is constructed by physically joining an array of FPD tiles together, with adjacent FPD tiles placed into close physical abutment. Such systems, however, tend to contain visually disturbing seams between the tiles resulting from the gaps between adjacent pixels on adjacent tiles, and from any components (e.g., interconnects, adhesives, seals, mechanical alignment components, etc.) located between adjacent tiles.

Another known type of tiled display system includes multiple FPD tiles which are tiled together via projection. In such systems, a single projection lens is placed in front of each FPD tile to project the displayed image onto a screen, and the projected images from the multiple FPD tiles are merged together to form a single tiled image. Such systems, unfortunately, suffer from several problems. One problem is that the depth or thickness of such systems may be relatively large due to the limited practical field of view of the single projection lens, which requires that the distance from the lens to its associated FPD tile be proportional to the size of that FPD tile. If, for example, each FPD tile comprises an LCD having 1280×1024 pixels in a 338×270 mm viewing area (i.e., 3.8 dots/mm), the distance of the single projection lens from the LCD must be proportional to the relatively large size of the LCD, which will hamper efforts to make the system thin. Another problem is that the projection lens may require high-quality optical characteristics to meet minimal system resolution and distortion requirements, which is expensive. If, for example, each FPD tile comprises an LCD having 1280×1024 pixels, the single projection lens may have no more than 0.06% distortion to ensure that the error is kept within half of a pixel in the corner.

Thus, there is a need for a display system that is suitable for the larger size, higher-resolution requirements of many new applications. There is also a need for a tiled display system which does not include visually disturbing seams between the tiles. Further, there is a need for a tiled display system which merges together projected images from multiple tiles to form a tiled image, but which does not require high-quality (and expensive) optics. Also, there is a need for a projection tiled display system which has minimal depth. In addition, there is a need for a modular and scalable high-definition display system. Further, there is a need for a high-resolution display system which is low cost and easy to fabricate.

SUMMARY OF THE INVENTION

According to one aspect of the invention, a tiled display apparatus includes a plurality of display devices, a screen, and a plurality of lens assemblies. Each display device is subdivided into a plurality of sections, with each section configured to display a sectional image. One of the lens assemblies is optically coupled to each section of each of the display devices to project the sectional image displayed on that section onto the screen. The lens assemblies are configured to merge the projected images into a single tiled image.

According to another aspect of the invention, a method of generating a tiled display includes the steps of providing a plurality of display devices, subdividing each of the display devices into a plurality of sections, displaying a sectional image on each section of each display device, and projecting the sectional image displayed on each section of each display device onto a screen with the projected sectional images merged into a tiled image.

Other aspects of the present invention will be apparent upon reading the following detailed description of the invention and viewing the drawings that form a part thereof.

DETAILED DESCRIPTION

In the following detailed description, reference is made to the accompanying drawings, which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural, logical, optical and electrical changes may be made without departing from the spirit and the scope of the invention. The following detailed description is, therefore, not to be taken in a limiting sense, and the scope of the present invention is defined by the appended claims and their equivalents.

Figure 1:
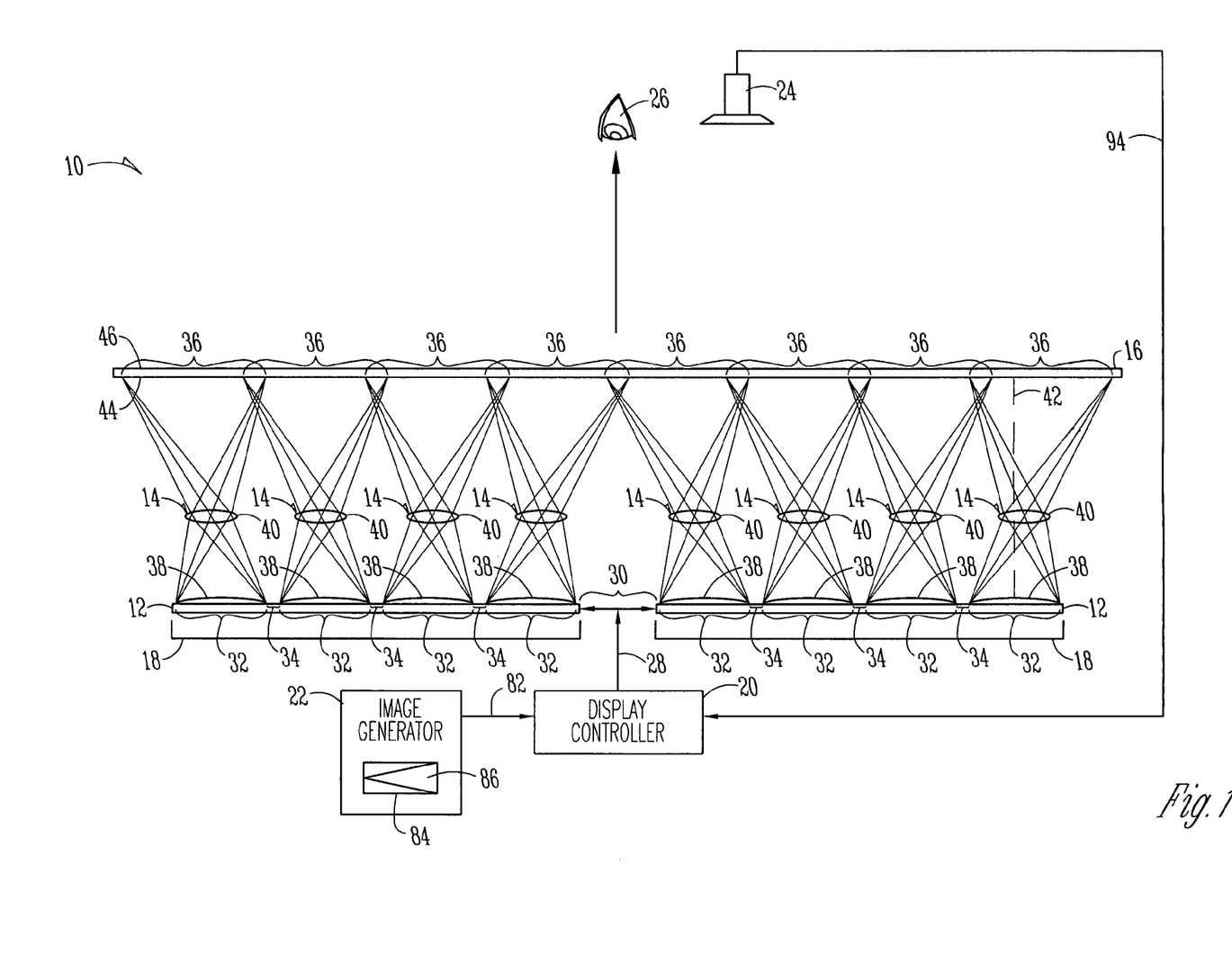
FIG. 1 is a system block diagram showing a seamless tiled display system including multiple display devices (e.g., LCDs) tiled together via projection to produce a larger and/or higher-resolution image in accordance with one embodiment of the invention.

Referring to FIG. 1, an exemplary seamless tiled display system 10 in accordance with the present invention includes a plurality of display devices 12, a plurality of lens assemblies 14, a screen 16, a plurality of backlight assemblies 18, a display controller 20, an image generator 22, and a detector 24. Tiled display system 10 is configured to generate a seamless, tiled image which is viewable by a viewer 26 located in front of screen 16.

Each display device 12 is capable of generating an image in response to display control signals 28 received from display controller 20. In one embodiment, each display device 12 comprises a flat-panel display (FPD), such as an active-matrix or passive liquid-crystal display (LCD), a plasma display, an organic light-emitting diode (OLED) display, etc. In another embodiment, each display device 12 comprises a non-FPD, such as a cathode ray tube (CRT) display, a projection display, etc. Each display device 12 includes an array of pixels, and may be a monochrome (i.e., gray-scale) or a color display. A variety of FPD and non-FPD displays are commercially available in a variety of sizes and resolutions. In one embodiment, each display device 12 comprises a Samsung SyncMaster 700 TFT panel, which has 1280×1024 pixels in a 338×270 mm viewable area, for a pixel pitch of 3.8 pixels/mm. However, other display devices may also be used in system 10.

Display devices 12 are arranged as an array of co-planar display "tiles", with a gap 30 being located between each pair of adjacent devices. Although only two display devices 12 (arranged in a 2×1 array) are shown in FIG. 1, tiled display system 10 may include any number of display devices 12 that are arranged in any size array (i.e., any m×n array of display devices 12, wherein m and n are any positive integers). Thus, system 10 is a scalable and modular display system since the number of display devices 12 can be selected to meet the needs of a particular application. The modular construction of system 10 allows for the modular construction of a display having any pixel count, and decouples the ultimate size and resolution of the display from current manufacturing and yield limitations.

Gap 30 represents a space between adjacent display devices 12 that may be filled with components for mounting display devices 12 within tiled display system 10. For example, interconnects, adhesives, seals or mechanical alignment components (not shown) may be located in gap 30 between adjacent display devices 12. In one embodiment, the width of gap 30 is the same or substantially the same as the width of the gaps of known tiled display systems constructed by physically joining an array of FPD tiles together, with adjacent FPD tiles placed into close physical abutment. For example, in one embodiment, adjacent display devices 12 are separated by a 12 mm gap. Thus, gap 30 would result in a visually disturbing seam if display devices 12 were viewed directly by viewer 26. However, system 10 uses projection to eliminate the gap 30 between adjacent display devices 12 from disturbing the image on screen 16.

Each display device 12 is subdivided into a plurality of sections 32, and each section 32 is configured to display a sectional image. As described in reference to FIG. 5, display controller 20 accounts for the subdivision of display devices 12 (electronically, or using a software program) when generating display control signals 28 so that, when display control signals 28 are applied to display devices 12, sections 32 display appropriate sectional images that can then be projected and merged into a single desired image. In the embodiment of FIG. 1, each display device 12 is subdivided into four (4) sections 32 along the x-axis (i.e., horizontally), and may further be subdivided along the y-axis (i.e., into the paper). Alternatively, each display device 12 may be subdivided into other integral numbers (i.e., 2, 3, 4, etc.) of sections along either the x or y-axis. In this embodiment, a dead-band region 34 is also defined between each pair of adjacent sections 32 on display devices 12. As described below, while the sectional image displayed on each section 32 is projected onto screen 16, any images that appear in dead-band regions 34 will not be projected onto screen 16. Thus, any pixels within dead-band regions 34 will not be used.

One of lens assemblies 14 is optically coupled to each of sections 32 of each of display devices 12 to project the sectional image displayed on that section onto screen 16. These images, referred to as projected sectional images, are projected onto screen 16 at screen sections 36. As shown in FIG. 1, these projected sectional images may overlap.

In one embodiment, each lens assembly 14 includes a field lens 38 and a projection lens 40. Each field lens 38 is located adjacent to one section 32 of display device 12, and is optically coupled to that section 32 to focus light passing through that section onto a respective projection lens 40. Without field lens 38, the light passing through that section 32 of display device 12 would spread out, and only a relatively small portion would reach projection lens 40. The focal length of each field lens 38 will be determined by the design of system 10. Each projection lens 40 is supported between its respective field lens 38 and screen 16, and is configured to project the light provided by that field lens 38 onto screen 16. Thus, each field lens 38 focuses a sectional image onto its projection lens 40, and each projection lens 40 projects that image onto screen 16 to form a projected sectional image.

The plurality of lens assemblies 14 are configured to merge the projected sectional images to form a seamless tiled image on screen 16. To form this image, lens assemblies 14 provide a combination of magnification having a magnitude of greater than 1 (e.g., +1.1; −1.1) and sideways shifting. In particular, lens assemblies 14 provide magnification such that the projected sectional images on screen 16 are larger than the corresponding sectional images on display devices 12. By providing such magnification, adjacent projected sectional images can be merged together while eliminating any visual disturbance resulting from the dead-band region 34 between each pair of adjacent sections 32 (which are not projected onto screen 16). Such magnification also helps eliminate any visual disturbance resulting from the gap 30 which separates adjacent display devices 12. The amount of magnification will depend on the particular design of tiled display system 10, but will be greater than 1×.

Lens assemblies 14 also provide sideways shifting. In particular, at least one lens assembly 14 is configured to provide a shift so that the projected sectional image on screen 16 is shifted sideways with respect to an axis normal to the corresponding sectional image. Such a normal axis 42 is shown in FIG. 1 for the right-most lens assembly 14 only. In the embodiment of FIG. 1, shifts to the left or right are implemented by shifting or offsetting projection lenses 40 to the left or right of the axis normal to the respective section 32. Since this results in the object sections (i.e., the sectional images) being shifted to one side of the projection lens axis (i.e., the axis normal to the projection lens), the image sections (i.e., the projected sectional images) are shifted to the opposite side of the projection lens axis. Thus, for example, since projection lens 40 of the right-most lens assembly 14 in FIG. 1 is shifted to the right, the respective projected sectional image on screen 16 is also shifted to the right with respect to its corresponding sectional image on section 32.

As shown in FIG. 1, some of lens assemblies 14 are configured to provide a right shift such that the respective projected sectional image is shifted right with respect to an axis normal to the corresponding sectional image, while others of lens assemblies 14 are configured to provide a left shift. For example, the lens assembly 14 on the left side of gap 30 is configured to provide a right shift, while the lens assembly on the right side of gap 30 is configured to provide a left shift. By configuring these two lens assemblies 14 adjacent to gap 30 to shift the respective projected sectional images sideways towards each other, any visual disturbance resulting from gap 30 can be eliminated from the tiled image.

Thus, by configuring lens assemblies 14 to provide an appropriate amount of magnification in combination with appropriate amounts and directions of sideways shifting, the projected sectional images are merged together to form a single, seamless tiled image on screen 16. The combination of magnification and shifting eliminates visual disturbances that would otherwise result from the dead-band regions 34 between each pair of adjacent sections 32, and from the gap 30 which separates adjacent display devices 12. By choosing an appropriate combination, dead-band regions 34 and gap 30 can be bridged without wasting a large percentage of the pixels located within the dead-band regions 34.

In another embodiment, the optical axis of each field lens 38 is the same as the optical axis of its respective projection lens 40. The optical axis of lenses 38 and 40 can be aligned by, for example, increasing the size or width of field lens 38, aligning the axis of field lens 38 with the axis of projection lens 40, and then cutting off any portion of field lens 38 that goes beyond an edge of its respective section 32. Referring to the right-most section 32 shown in FIG. 1, for example, field lens 38 would be made wider than section 32 such that, when the left edge of field lens 38 is aligned with the left edge of section 32, field lens 38 and projection lens 40 would each share a common normal axis. Then, any excess portion of field lens 38 extending over the right edge of section 32 would be cut off.

Figure 2:
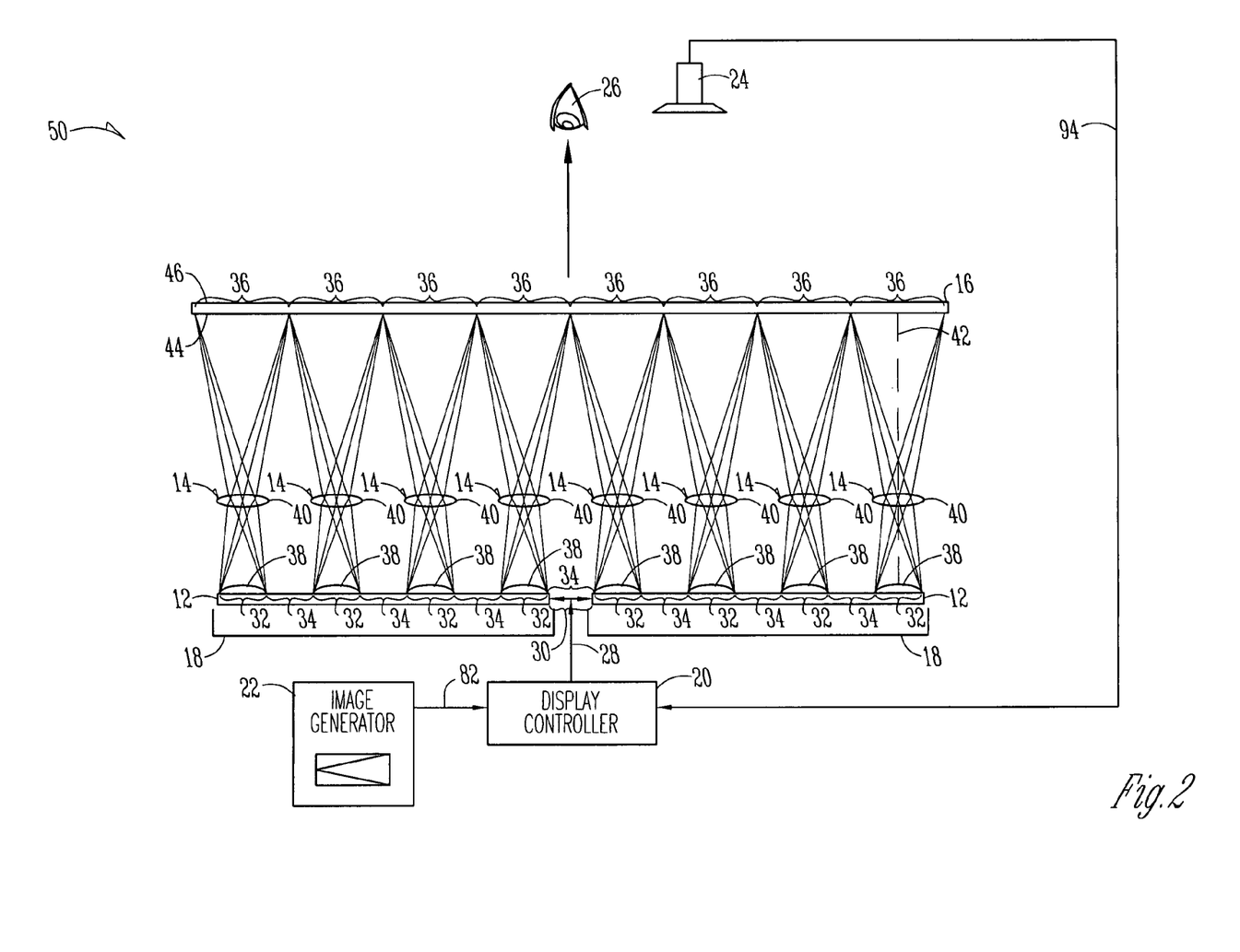
FIG. 2 is a system block diagram showing a seamless tiled display system including multiple display devices (e.g., LCDs) tiled together via projection to produce a larger and/or higher-resolution image in accordance with another embodiment of the invention.

Referring to FIG. 2, a tiled display system 50 in accordance with an alternative embodiment of the present invention is shown. The components and structure of system 50 are generally the same as those of system 10, with differences in the subdivision of each display device 12, and the parameters of lens assemblies 14. In particular, the width of the dead-band regions 34 defined between each pair of adjacent sections 32 on display devices 12 is now substantially equal to the width of the gap 30 between devices 12, and the lens assemblies 14 are now configured to merge the projected sectional images to form a seamless tiled image on screen 16 using magnification, but without using sideways shifting.

Lens assemblies 14 of system 50 provide magnification such that the size of each projected sectional image on screen 16 is equal to (or greater than) the size of the corresponding sectional image on the display device 12 plus the size of the dead-band region 34. If the projected sectional images are greater than this sum, the projected sectional images will overlap. Also, the projection lenses 40 of lens assemblies 14 are no longer offset with respect to the axis 42 that is normal to the corresponding sectional image, thereby eliminating the shifts provided by the lens assembly configurations shown in FIG. 1. Thus, since the width of dead-band regions 34 is now substantially equal to the width of gap 30, and because the amount of magnification is sufficient to bridge the dead-band regions 34, the amount of magnification is also sufficient to bridge gap 30. Therefore, neither dead-band regions 34 nor gap 30 will cause a visual disturbance on screen 16.

In FIG. 2, each section 32 is shown as being substantially the same size as deadbands 34 and gap 30. This configuration disadvantageously wastes a relatively large percentage of pixels (since each unused dead-band 34 is as large as each used section 32). Alternatively, each section 32 may be defined to be larger than dead-bands 34 and gap 30 (with dead-bands 34 and gap 30 still being substantially the same size), thereby decreasing the percentage of pixels in display devices 12 that will not be used. System 10 shown in FIG. 1 may be modified to create such a system by mounting the display devices 12 closer together such that gap 30 has substantially the same width as dead-bands 34, eliminating the offsets of projection lenses 40 to eliminate any shifts, and changing the magnification that is provided by each lens assembly 14 to provide an appropriate amount of overlap.

Although each lens assembly 14 is depicted in FIGS. 1 and 2 as being an optical cell with both a field lens and a projection lens, other forms of optical cells may be used. For example, an optical cell including only a single projection lens configured to project the light coming through each section 32 of display device 12 onto screen 16 may be used. Such a lens could be placed relatively close to the respective section 32 to aid in collecting light. Other optical cells, with other numbers and types of optical lenses, may also be used.

In two embodiments of the present invention, each section 32 of display devices 12 forms a square, or a rectangle. In another embodiment, each section 32 forms a hexagon. Making each section 32 a hexagon may result in tighter packaging and smaller image circle requirements, thus resulting in a simpler design. In the hexagon embodiment, each display device 12 will include half and quarter hexagons surrounding the edges. The gaps may be filled from the adjacent display device, or each lens may be cut in half (or in quarters for the corners) with a mirror placed between the display devices 12 (so that the image associated with each display device 12 will come only from that display device). Alternatively, shapes other than these may be used for each section of display devices 12.

Screen 16 comprises a rear projection screen having a rear side 44 and a front side 46. The sectional images from display devices 12 are projected onto rear side 44 by lens assemblies 14, and the resulting tiled image is viewable by viewer 26 from front side 46.

In one embodiment, the tiled image is used as the object for a high-magnification projection lens. The advantages of this approach include the thin size of the total image engine, and the ability to package the tiled, sensitive-to-motion parts in one rugged box.

One advantage of the present invention is that tiled display system 10 can be made thin in comparison with previous display systems due to the tradeoff between the number of lens assemblies 14 provided for each display device 12, and the depth of system 10. The practical field of view for each projection lens is limited, which requires that the distance from the projection lens to the display device be proportional to the size of the object image (i.e., the sectional image at section 32) for that lens. Thus, by decreasing the size of the sectional images and increasing the number of projection lenses needed to cover display devices 12, the distance from those lenses to the display devices can be proportionately reduced. Therefore, the depth of tiled display system 10 can be reduced, within practical limits, simply by increasing the number of lens assemblies 14, with each lens assembly covering a smaller section 32. For example, if the number of lens assemblies 14 shown in FIG. 1 was increased from four to eight per display device, and the size of each section was cut in half, then the thickness of tiled display system 10 could be cut roughly in half.

Another advantage of tiled display system 10 is that each projection lens 40 covers only a relatively small area. As the field of view for each lens 40 is decreased by making the subdivisions smaller, the minimum resolution that each lens 40 must support decreases. Thus, the performance requirements of lenses 40 may be significantly relaxed in comparison with systems that use only a single projection lens for each display device. Also, since each subdivision has less area, each subdivision requires less light. Thus, the light source for each subdivision can advantageously be made smaller. Further, since the image of the source in each projection lens is smaller, the diameter of each projection lens can be made smaller, thus resulting in a lighter and cheaper design for the projection lenses.

Still another advantage of tiled display system 10 involves the ease of distortion correction due to the subdivision of each display device 12 into smaller sections. For a single-projection lens solution with a 1280×1024 pixel display panel, distortion of only 0.06% would cause an error of half of a pixel in the corner. However, by subdividing the panel into a plurality of 100×100 pixel sections, each projection lens could have almost 1% distortion and still have an error of half of a pixel. By making the sections smaller, the acceptable amount of distortion could be made even larger. Distortion can be corrected to a desired level simply by using an optical surface substantially removed from the aperture stop of the lens. Further, by using lens assemblies which provide magnification having a magnitude of close to 1 (e.g., +1.1; −1.1), an optical design with a high degree of symmetry can be used. Thus, odd aberrations such as distortion will be small, and a simple optical system which may not require electronic distortion correction may be used. Since the optical design can be simple, and the performance requirements for each lens can be relaxed, it may be possible to make the lenses out of molded plastic. The use of molded plastic lenses would be advantageous in terms of cost, weight and ease of assembly. It is also possible to mold arrays of lenses for each display device 12, thereby reducing the complexity of assembly. It may also be possible to use identical lenses in different locations for each subdivision. For example, a three-lens system that requires only two molds could be used.

Backlight Assemblies

Referring back to FIG. 1, tiled display system 10 may also include a backlight assembly 18 optically coupled to each of display devices 12, if required by devices 12. Each backlight assembly 18 includes one or more sources that generate light that is applied to the associated display device 12. If the display device is an LCD, for example, the LCD includes a plurality of light valves that are selectively clear or opaque, under the control of display control signals 28 from display controller 20. When a particular light valve is clear, the light from the backlight assembly 18 passes through. However, if the light valve is opaque, the light from the backlight assembly 18 is blocked. Thus, by generating appropriate display control signals 28, display controller 20 is capable of selectively controlling the light valves of display devices 12 to generate an image on those devices 12.

In one embodiment, each backlight assembly 18 comprises a florescent light and a cavity, with the cavity being used to distribute the light generated by the florescent light onto the back of associated display device 12. While such a backlight assembly is very simple and can advantageously be made thin, the resulting backlight may not be efficient. In another embodiment, a single light source provides light to multiple display devices 12.

In another embodiment, each backlight assembly 18 is subdivided into a plurality of backlight channels, with each channel configured to provide backlighting for one section 32 of the corresponding display device 12. The subdivision of the backlighting scheme may thus match the above-described subdivision of the projection scheme. By subdividing the backlight into multiple channels, the area covered by each backlight channel can be significantly reduced as compared to an undivided backlight. Since backlight assemblies require a minimum useful length to provide a desired level of uniform backlighting for a given output size, reducing the area covered by each backlight channel can result in a reduction in the thickness of the backlight assembly. This reduction in the thickness of the backlight assembly can further reduce the thickness of the overall tiled display system 10.

Figure 3:
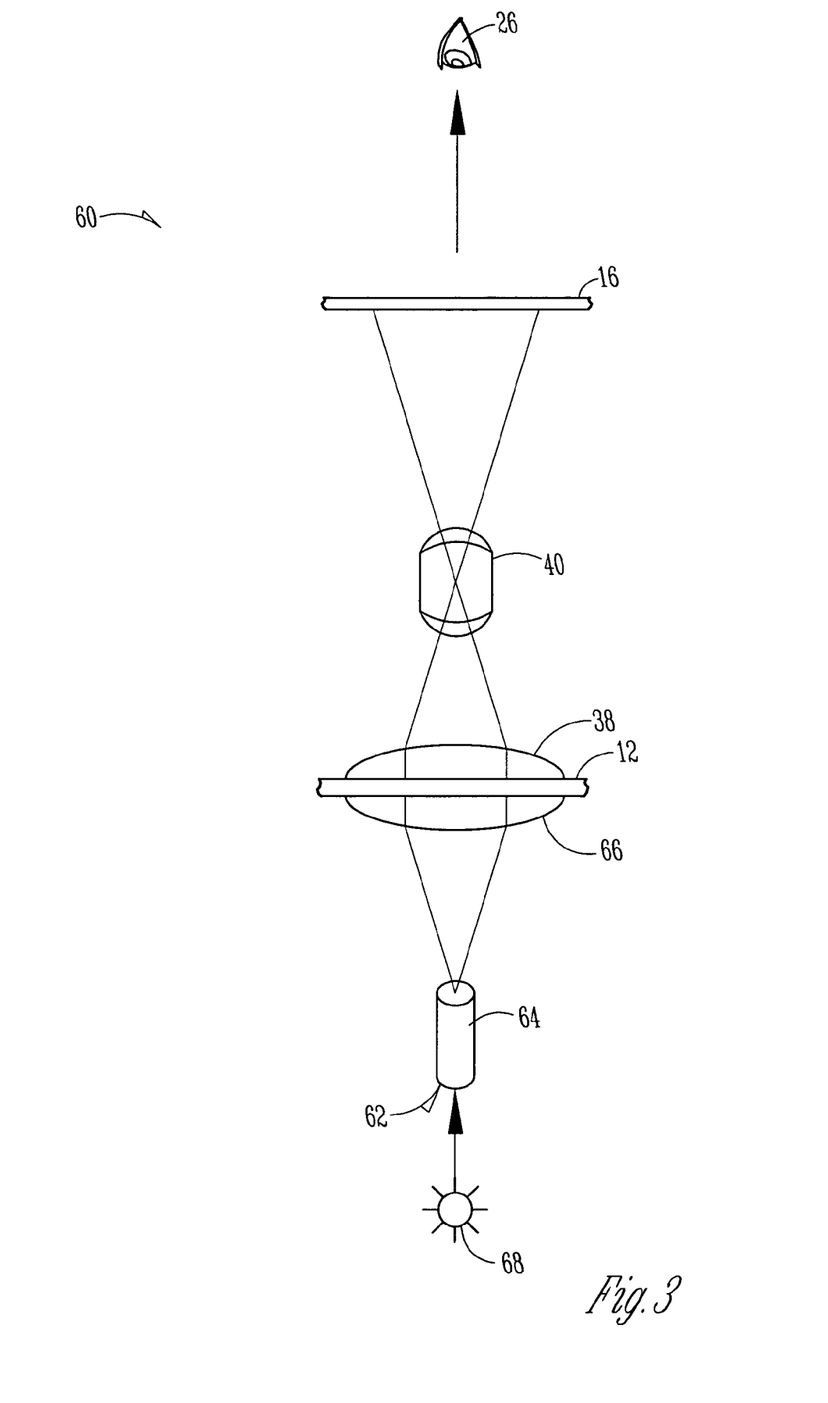
FIG. 3 is a block diagram of an exemplary embodiment of a unit cell projector for the tiled display system of FIG. 1, including a backlight system employing fiber bundles.

Referring to FIG. 3, an exemplary embodiment of a "unit cell" projector 60 is for use with a tiled display system including a backlighting system employing fiber bundles. Projector 60 is a "unit cell" projector since it is configured to project one section 32 of display device 12 onto screen 16. The tiled display system would include an array of unit cell projectors 60 for each display device 12. Projector 60 provides a backlight channel 62 for each section 32 that includes a fiber bundle 64 and a condenser 66. Fiber bundle 64 is configured to communicate light received from a light source 68 (e.g., an arc lamp, LED, etc.) onto condenser 66, and condenser 66 is configured to concentrate the light received from light source 68 via fiber bundle 64 onto the respective section 32 of display device 12. Light passing through this section 32 is focused by field lens 38 onto projection lens 40, and is projected onto screen 16 to form a projected sectional image viewable by viewer 26.

In one embodiment where sideways shifting is used with unit cell projectors 60, the optical axis of condenser 66, field lens 38 and projection lens 40 of each projector 60 are the same. This is done in a manner similar to that described above for aligning the optical axis of field lens 38 and its respective projection lens 40 in the embodiment of FIG. 1.

Figure 4:
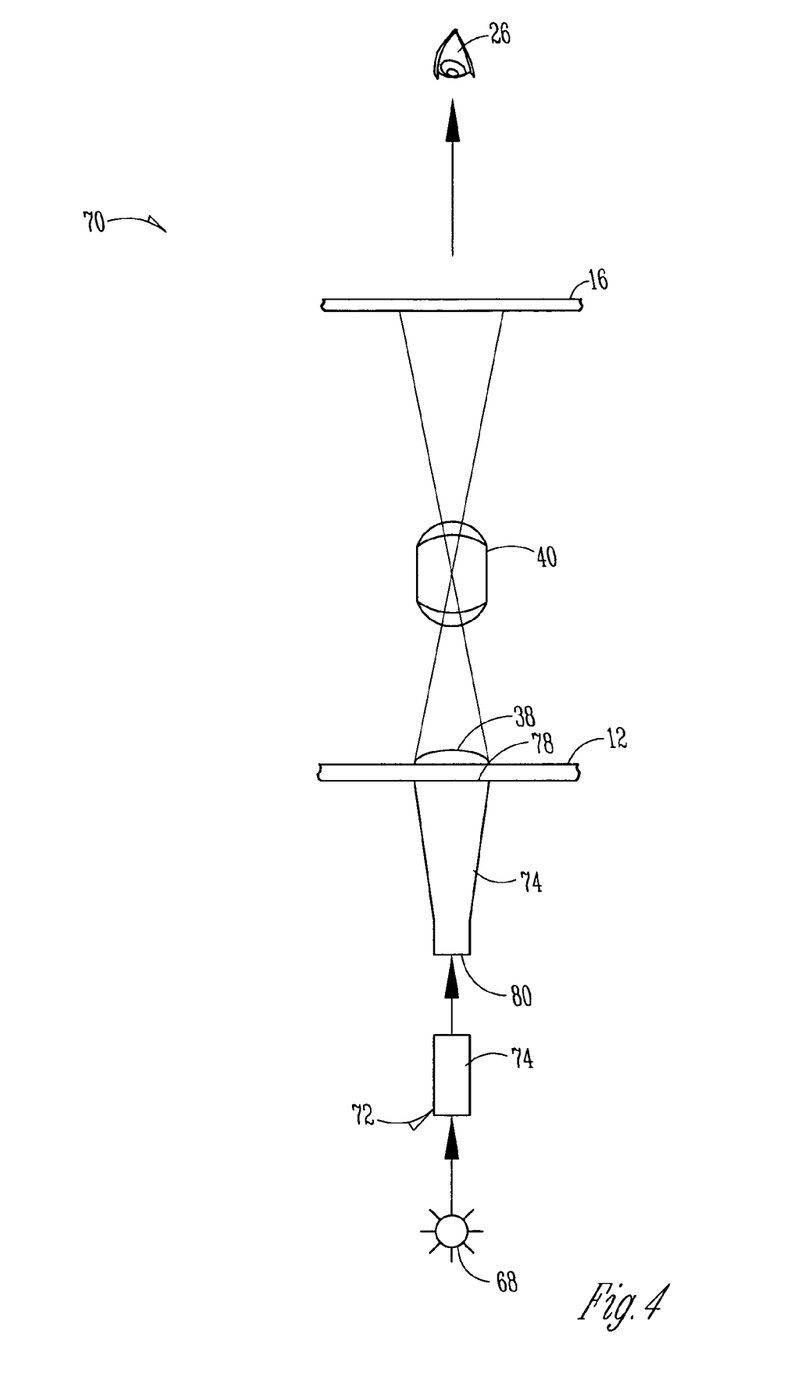
FIG. 4 is a block diagram showing another exemplary embodiment of a unit cell projector for the tiled display system of FIG. 1, including a light pipe backlight system.

Referring to FIG. 4, another embodiment of a "unit cell" projector 70 is for use with a tiled display system including a backlighting system employing tapered light pipes. Projector 70 provides a backlight channel 72 for each section 32 of display device 12, with each channel 72 including a light guide 74 and a tapered light pipe 76. Light guide 74 is part of a system for distributing light from light source 68 to light pipe 76. Tapered light pipe 76 uses the principle of internal reflection to obtain a desired level of light uniformity at its exit pupil 78. The minimum length of light pipe 76 from entrance pupil 80 to exit pupil 78 that is required to obtain a desired level of light uniformity is relatively small due to the subdivision of the backlighting system. Since the tiled display system would include an array of unit cell projectors 70 corresponding to the array of sections 32 on each display device 12, there would be an array of light pipes 76 for each device 12. The light passing through the respective section 32 of display device 12 is focused by field lens 38 onto projection lens 40, and is then projected onto screen 16 to form a projected sectional image.

A number of methods may be used to distribute light to the array of light pipes 76 on each display device 12. For example, light source 68 may comprise a single light source (which may be monolithic, or may include a plurality of light sources) for each display device 12, or may include multiple light sources for each display device 12. The light guide 74 may comprise a separate component for each light pipe 76, or may include a single component used for guiding light to a plurality of light pipes 76. Light guide 74 may include, for example, fiber bundles, solid light guides such as liquid light guides or large plastic fibers, or slab waveguides cut from one original piece. Alternatively, light guide 74 may be omitted, with light from light source 68 being coupled directly to light pipe 76.

By using tapered light pipes 76, the backlighting system can apply well-collimated light (i.e., light having relatively small angles) to display device 12. Since this will result in the light passing through display device 12 being well collimated as well, field lens 38 can focus this light onto a relatively small spot where this light goes through projection lens 40. Thus, the design of projection lens 40 can be made simpler due to its smaller aperture.

In another embodiment, a light source could be placed behind a lens, and the lens could be configured to control the size and numerical aperture of the backlight. Light sources which do not require any conditioning could also be used, such as light-emitting diodes (LEDs). In another embodiment, one or more slab waveguides that have extraction dots could be positioned behind display devices 12, with each waveguide covering a portion of one display device 12, an entire display device 12 or multiple display devices 12. These dots would then act as the source for light pipes, lenses, or other conditioning optics.

Display Controller

Referring back to FIG. 1, display controller 20 is configured to generate display control signals 28 in response to display signals 82 received from image generator 22. Image generator 22 is any device which generates signals 82 indicative of a desired image, such as image 84 (which may, for example, be a pennant 86). Thus, image generator 22 may be a computer system configured to generate images. Display controller 20 processes display signals 82 to form display control signals 28, and may be implemented in hardware or software. For example, display controller 20 may be implemented as a hardware circuit external to image generator 22, as an image-processing circuit board mounted internally to image generator 22, or as a software program executed by image generator 22. Exemplary processing steps performed by display controller 20 are described in reference to FIG. 5.

Figure 5:
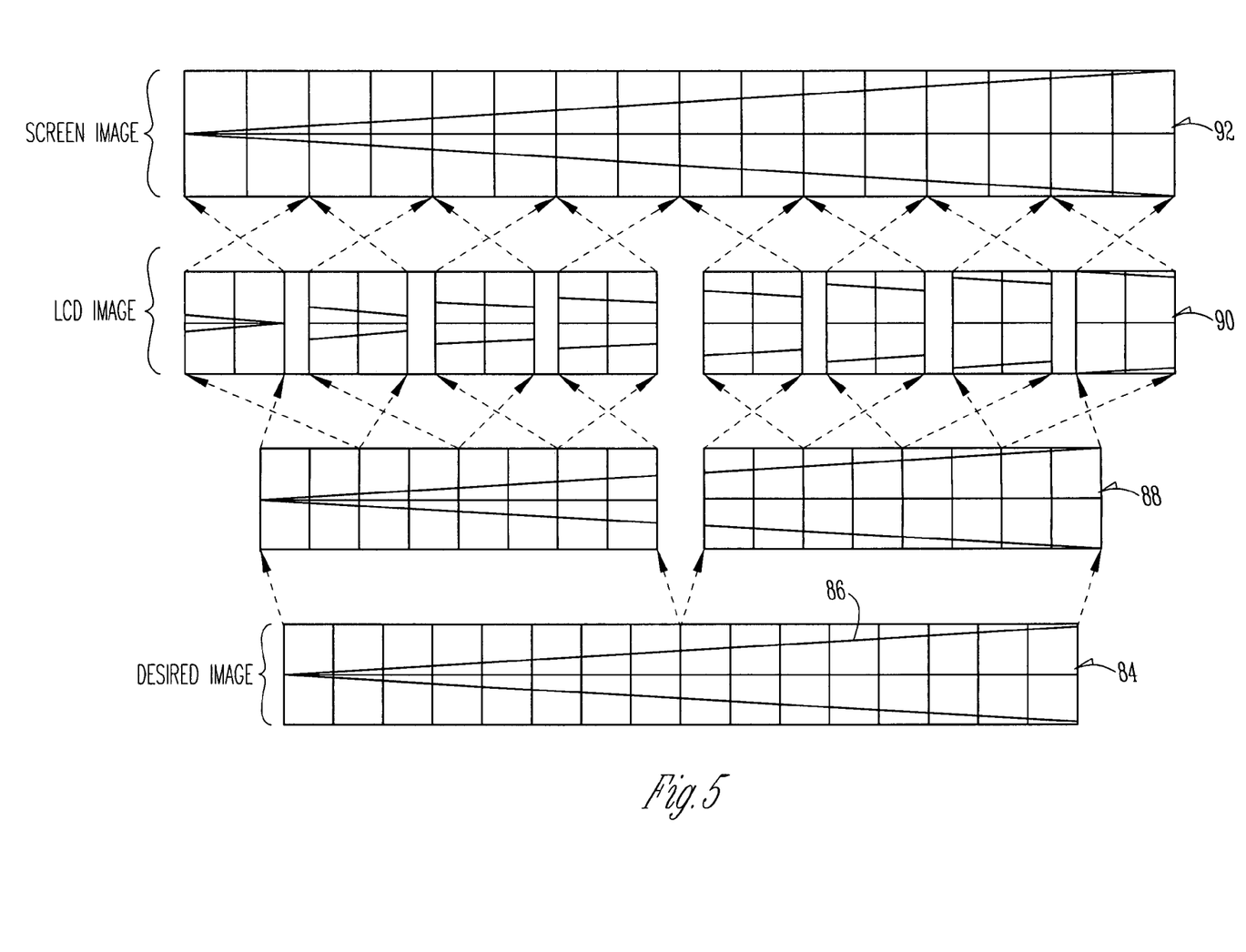
FIG. 5 is a simplified diagram showing the electronic and optical image processing performed by the display controller and optics shown in FIG. 1, wherein a desired image undergoes several intermediate processing steps before being displayed on the screen.

Referring to FIG. 5, and working from bottom to top, display controller 20 receives display signals 82 indicative of desired image 84 from image generator 22. In this example, desired image 84 comprises pennant 86. Then, display controller 20 subdivides desired image 84 into a number of panels in accordance with the arrangement of display devices 12 in tiled display system 10. For example, since tiled display system 10 includes two display devices 12 along the x-axis, as shown in FIG. 1, display controller 20 subdivides desired image 84 into two panels, as shown at reference numeral 88 in FIG. 5. In this example, these two panels now include the left and right portions of pennant 86.

Then, display controller 20 subdivides each panel of desired image 84 into a number of sub-panels in accordance with the number of sections 32 defined on each display device 12. For example, since each display device 12 includes four sections 32, each panel of desired image 84 is subdivided into four sub-panels. To account for dead-band regions 34 between each pair of adjacent sections 32 of display device 12, display controller 20 also inserts a dead-band region between each pair of adjacent sub-panels. The pixels in these dead-band regions will not be projected onto screen 16 by lens assemblies 14. Also, since each lens assembly 14 is configured to reverse (i.e., rotate) each sectional image as that image is optically projected from display device 12 to screen 16, display controller 20 also reverses each sub-panel. Display controller 20 then generates display control signals 28 which, when applied to display devices 12, generate images on display devices 12 as shown at reference numeral 90 in FIG. 5. If these images were viewed directly, viewer 26 would see four sectional images on each display device 12, with each pair of adjacent sectional images being separated by a dead-band region, and with each sectional image reversed.

Alternatively, if lens assemblies 14 were configured to project the sectional images without reversing these images, the display controller would not reverse each sub-panel.

Once the sectional images are displayed on display devices 12, lens assemblies 14 operate to project these sectional images onto screen 16 to form projected sectional images. These projected sectional images are merged by being magnified and (possibly) shifted to form the single tiled image shown at reference numeral 92 of FIG. 5. Thus, the tiled image shown at reference numeral 92 is the same as the desired image at reference numeral 84.

The particular processing performed by display controller 20 will depend upon the parameters of tiled display system 10, such as the arrangement of display devices 12, the subdivision of display devices 12 into sections, and the dead-band 34 between each section.

As suggested by FIG. 5, another advantage of projecting subdivisions of display devices 12 is the natural division of the processing workload. This natural division means that parallel processing may be easily implemented for display device blocks, for each display device, for multiple subdivisions of each display device, or for each individual subdivision. Since many sections may require the same type of processing, pipelining may be used. If there are several steps involved in processing each subdivision, a separate processor may be used to perform each step, thus allowing for the use of several relatively simple processors in series to perform the work of fewer relatively complex processors.

Distortion Control

Distortion refers to errors that may occur between the actual locations of pixels on screen 16, and the desired locations of the pixels. As indicated above, the subdivision of each display device 12 may allow any distortion correction to be performed optically, thus eliminating the need for electronic distortion control. If, however, it is not desirable or sufficient to correct for distortion optically, electronic distortion correction may be used. Generally, electronic distortion correction involves generating feedback signals representative of the distortion, and using the feedback signals to cancel out the distortion.

To provide for electronic distortion correction, tiled display system 10 may include detector 24, which is configured to detect the tiled image produced on screen 16, and to generate feedback signals 94 used by display controller 20 to correct for any distortion. In one embodiment, display controller 20 generates signals 28 to display a particular pattern (e.g., a grid of dots, gridlines, etc.) on screen 16. Detector 24 senses the resulting pattern produced on screen 16, and generates feedback signal 94. Display controller 20 uses feedback signal 94 to characterize any errors between the commanded and the actual patterns, and introduces an equal and opposite amount of error to cancel out the distortion.

In another embodiment, detector 24 comprises a moveable camera or detector configured to generate a detection signal when the camera passes over the location of a dot within a grid of dots, with the location of each dot determined by the location of the detector when the dot is detected. In another embodiment, with detector 24 in a fixed location, one line is turned on at a time, and the location of that line on screen 16 is detected. Then, when it is desired to create a line at a location on screen 16, the appropriate line is turned on. This latter embodiment may provide faster distortion correction since detector 24 does not move.

In still another embodiment, detector 24 comprises a pixelated camera configured to take a picture of screen 16. The pixels of display devices 12 and the camera will form a Moiré pattern (i.e., since the pixelated camera and display devices 12 both have a periodic structure, superimposing these structures will yield a low-frequency periodic structure showing the difference between these two frequencies). A variety of schemes can be used to find the phase map from a fringe pattern, including fringe center detection and phase shifting algorithms. The phase information may then be converted into a distortion map, and this map may then be inverted by display controller 20 to produce a pre-warped image.

Besides distortion, viewing angle variations in the luminance may create another artifact that may need to be controlled. This artifact arises from the shift variant behavior of projection screens. Methods for controlling this artifact may include using a relatively large amount of overlap between adjacent tiles on screen 16 (which will give a gradual transition from one side to the other), or using projection optics with a narrow field of view (i.e., small angles). It may also be possible to use a single or dual-sided lenticular prescreen to remove the shift variance, or a fiber faceplate, or a screen that has small grooves etched into its back surface. The vertical surfaces made by the grooves will reflect the light entering each post, so the output from each post will have light coming from up to four directions, resulting in the equivalent of overlap taking place on the sub-pixel level.

EXAMPLES

Figure 6:
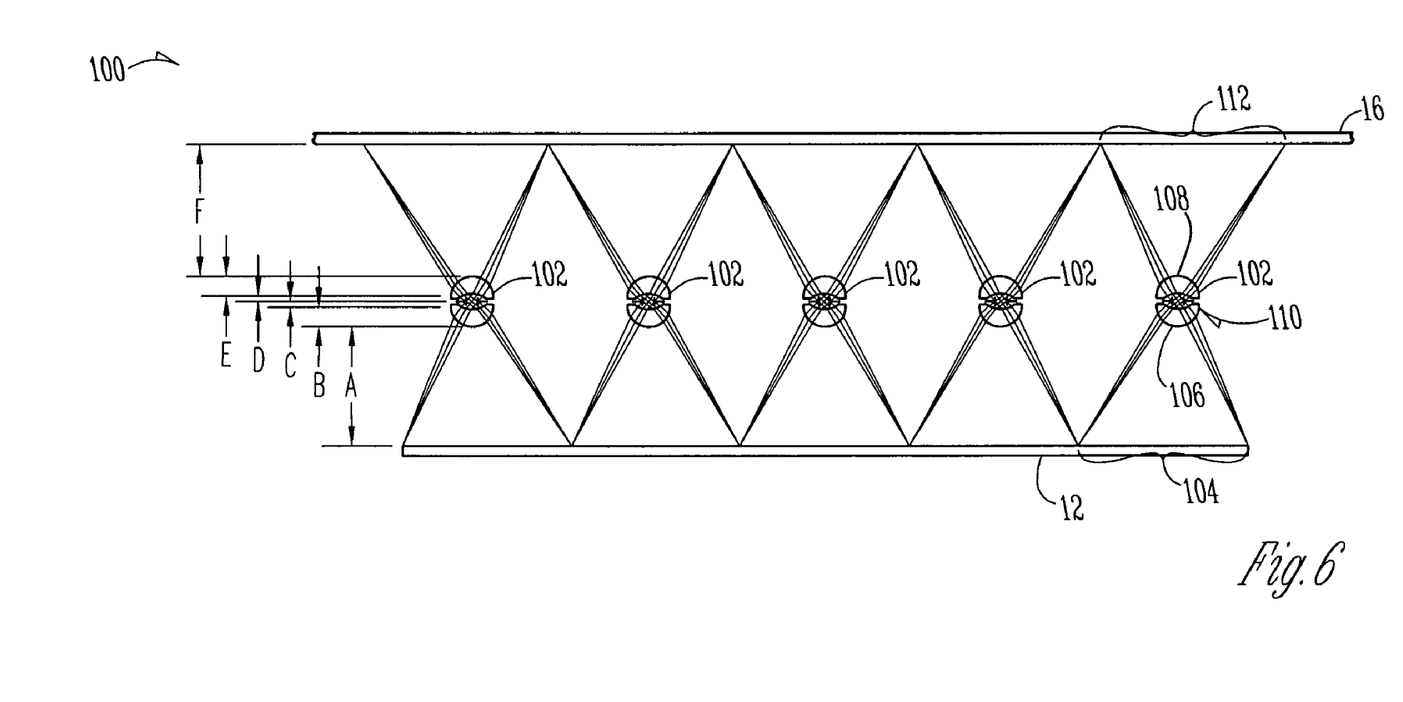
FIG. 6 is a simplified block diagram illustrating one exemplary optical system for projecting an image displayed on one of the display devices of FIG. 1 onto a screen.
Figure 7:
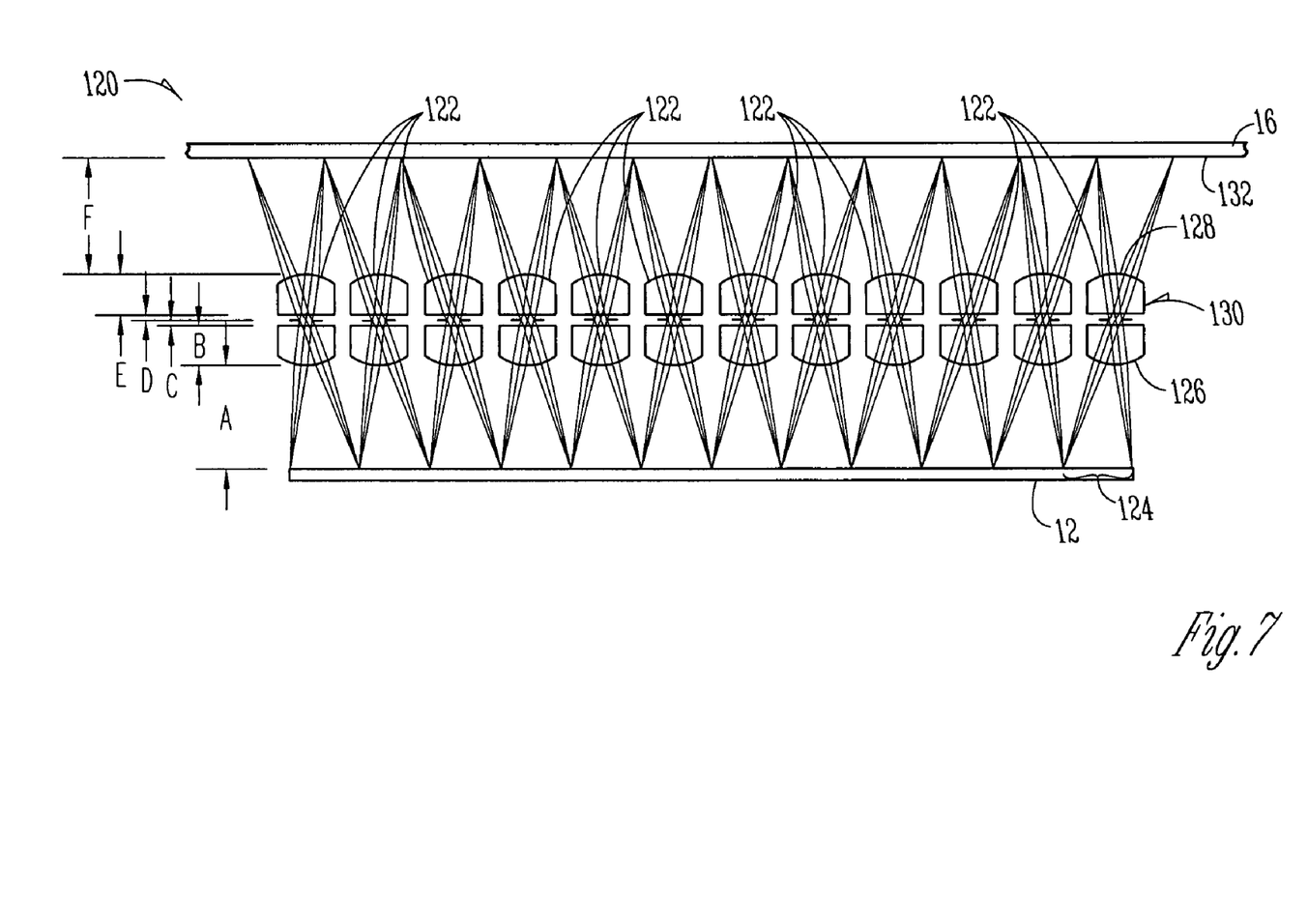
FIG. 7 is a simplified block diagram illustrating another exemplary optical system for projecting an image displayed on one of the display devices of FIG. 1 onto a screen.
Figure 8:
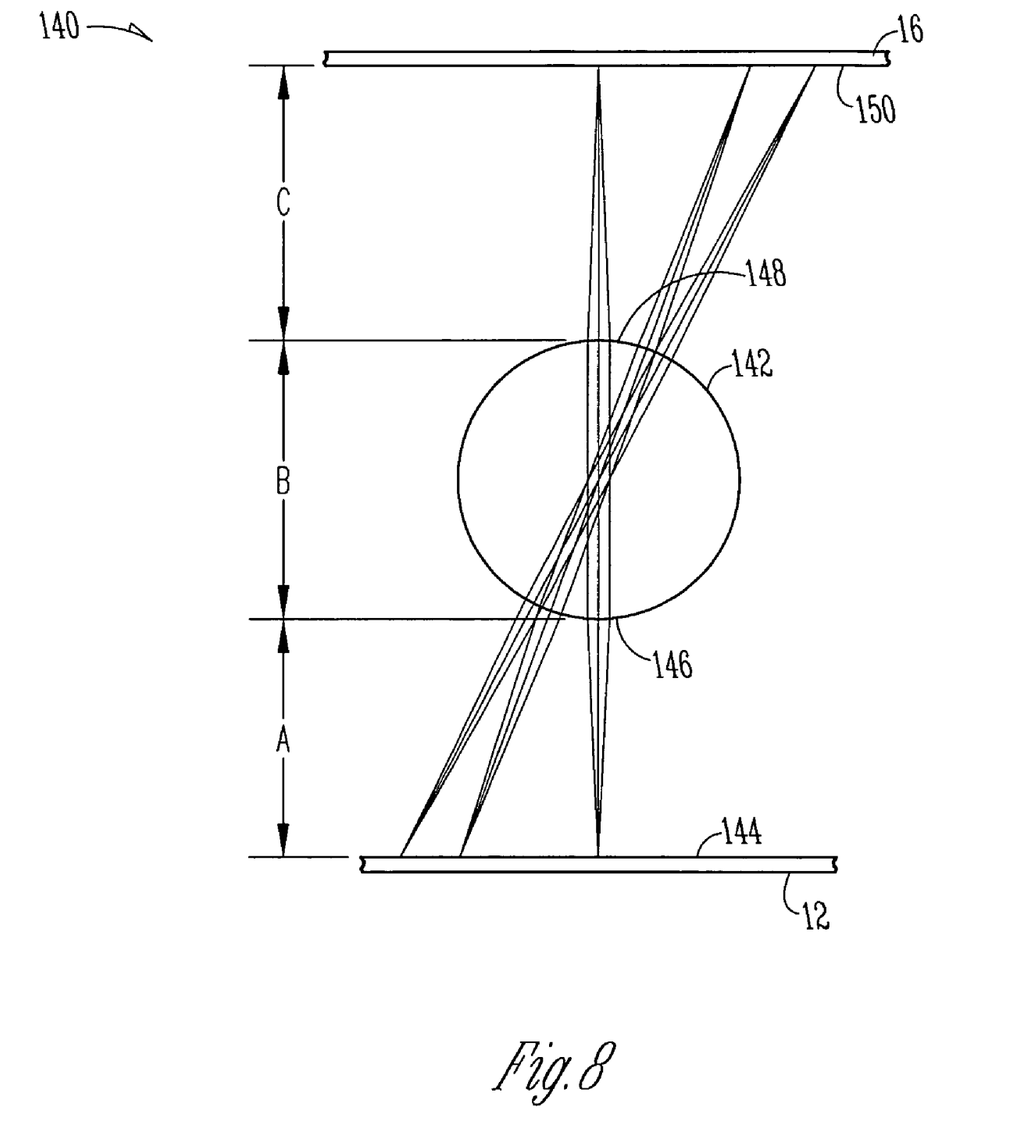
FIG. 8 is a simplified block diagram illustrating another exemplary optical system for projecting an image displayed on one of the display devices of FIG. 1 onto a screen.

Other exemplary optical systems for use in the present invention are shown in FIGS. 6–8. The systems in the examples of FIGS. 6 and 7 are configured to project the sectional images displayed on one of display devices 12 onto screen 16. Thus, a tiled display system would use one of these optical systems per display device 12. The optical system shown in FIG. 8 is configured to project one sectional image on one of display devices 12. Thus, a tiled display system would use a plurality of these unit optical cells per display device 12.

In creating these examples, a number of design assumptions and constraints were used, including: each display device 12 will comprise a Samsung SyncMaster 700 TFT panel, which has 1280×1024 pixels in a 338 mm×270 mm viewable area, for a pitch of 3.8 pixels/mm; a 12 mm dead-band will be around each LCD; root-mean-square (RMS) spot size (diameter) will be less than the pixel size; the total thickness of the system will be less than 100 mm (not including the backlight); distortion will be limited to half of a pixel; the entrance pupil will have a minimum diameter of four mm; the backlight design will be matched to the lens pupil; and the lenses will be restricted to singlets or air-spaced doublets. The actual design assumptions and constraints would depend upon the particular application, and may be the same as or different from those set forth in this paragraph. For example, in one embodiment, triplet lenses could be used instead of doublet lenses.

In each of these three examples, a symmetrical optical system was selected based upon a geometrical analysis indicating that only minimal magnification (e.g., 1.1×) was required, and based upon the need for excellent distortion control. By having only a small angle cone of light going to each image point, a slight defocus can achieve the desired magnification. By choosing a symmetrical optical system, distortion is minimized, thereby eliminating the need for complex image warping electronics. The absence of all aberrations of the field except astigmatism and field curvature allows for a wide-angle design. Also, by making both lenses in a doublet of identical lenses, costs can be reduced via commonality of parts and because only one mold would be required for plastic lenses. Also, where plastic lenses are used, manufacturing costs can also be reduced by molding an array of plastic lenses for projecting an array of sectional images onto the screen.

Referring to FIG. 6, an exemplary optical system 100 includes five projection lenses 102 arranged to cover the longer (338 mm) side of the LCD, with each lens covering ⅕ of the length (67.6 mm). System 100 also includes four projection lenses 102 arranged to cover the shorter (270 mm) side of the LCD, with each lens covering ¼ of the width (67.5 mm). Thus, to cover the entire LCD, system 100 includes a total of 20 projection lenses 102 arranged in a 5×4 array, with each lens covering a substantially square area. Optical system 100 was designed to minimize the number of projection lenses per LCD. In system 100, a display surface 104 of device 12 forms the object, with an infinite radius of curvature. Each projection lens 102 is an air-spaced symmetrical doublet, including a first lens 106 having an outer radius of curvature of 6.779 mm and an inner radius of curvature of 7.272 mm, and a second lens 108 having an inner radius of curvature of −7.272 mm and an outer radius of curvature of −6.779 mm. In this embodiment, projection lenses 102 are made of polystyrene. A stop 110, passing through each projection lens 102, and an image surface 112 of screen 16, each have an infinite radius of curvature. Distance a between surface 104 and the outer surface of first lens 106 is 37.31 mm. Distance b between the outer and inner surfaces of first lens 106 is 5.414 mm. Distance c between the inner surface of first lens 106 and stop 110 is 2.532 mm. Distance d between stop 110 and the inner surface of second lens 108 is 2.535 mm. Distance e between the inner and outer surfaces of second lens 108 is 5.414 mm, and distance f between the outer surface of second lens 108 and image surface 112 is 41.89 mm. Thus, the overall thickness of system 100 (i.e., the distance from display surface 104 to image surface 112) is about 95.1 mm.

Referring to FIG. 7, another exemplary optical system 120 includes 12 projection lenses 122 arranged to cover the longer (338 mm) side of the LCD, with each lens covering 1/12 of the length (28.2 mm). System 100 also includes seven projection lenses 122 arranged to cover the shorter (270 mm) side of the LCD, with each lens covering 1/7 of the width (38.6 mm). Thus, to cover the LCD, system 120 includes a total of 84 projection lenses 122 arranged in a 12×7 array, each lens covering a rectangular area. In comparison with system 100, optical system 120 was designed to limit the field of view for each projection lens. In system 120, a display surface 124 of device 12 forms the object, with an infinite radius of curvature. Each projection lens 122 is an air-spaced symmetrical doublet, including a first lens 126 having an outer radius of curvature of 16.29 mm and an inner radius of curvature of 60.07 mm, and a second lens 128 having an inner radius of curvature of −60.07 mm and an outer radius of curvature of −16.29 mm. In this embodiment, projection lenses 122 are made of polystyrene. A stop 130, passing through each projection lens 122, and image surface 132 of screen 16, each have an infinite radius of curvature. Distance a between surface 124 and the outer surface of first lens 126 is 32.73 mm. Distance b between the outer and inner surfaces of first lens 126 is 12.50 mm. Distance c between the inner surface of first lens 126 and stop 130 is 1.935 mm. Distance d between stop 130 and the inner surface of second lens 128 is 1.935 mm. Distance e between the inner and outer surfaces of second lens 128 is 12.50 mm, and distance f between the outer surface of second lens 128 and image surface 132 is 37.38 mm. The thickness of system 120 (from display surface 124 to image surface 132) is about 99.0 mm.

By limiting the field of view for each projection lens 122 relative to that of system 100, system 120 may simplify the complexity of the backlight assembly, and decrease the likelihood of tiling non-uniformities due to screen properties in comparison to system 100. Further, by dividing the LCD into smaller pieces, the performance requirements of projection lenses 122 may be relaxed in comparison to those of projection lenses 102. This relaxation may allow looser tolerances, which may allow the lenses to be less expensive. System 120 also has a larger entrance pupil for the light from display device 12. In one embodiment, the pupil has a diameter of 6.4 mm, allowing 20% more light to pass through.

Referring to FIG. 8, another exemplary optical system 140 uses a ball lens 142 for projecting each sectional image on display device 12 onto screen 16. In this design, the angular extent of the light coming from the LCD may be limited by the backlight assembly. While this may increase the complexity of the backlight assembly, this complexity may be more than offset by cost reductions in the projection optics and manufacturing process since ball lenses are inexpensive, and mounting and alignment considerations are simpler. By using a ball lens, distortion, coma and astigmatism are removed, and the only third-order aberrations present are spherical and field curvature. In one embodiment, ball lens 142 is an acrylic ball, or section thereof. Distance a from a display surface 144 of device 12 to surface 146 of ball lens 142 is 30.47 mm. Distance b from surface 146 to opposite surface 148 of ball lens 142 (i.e., the diameter of ball lens 142) is 36.0 mm. Distance c from surface 148 to an image surface 150 of screen 16 is 35.07 mm. Thus, the thickness of system 140 (i.e., from display surface 144 to image surface 150) is about 101.5 mm. Note that, provided the stop is formed by the backlight and the entrance pupil is 4 mm or smaller, image quality will be acceptable over a 50 mm circle.

Figure 9:
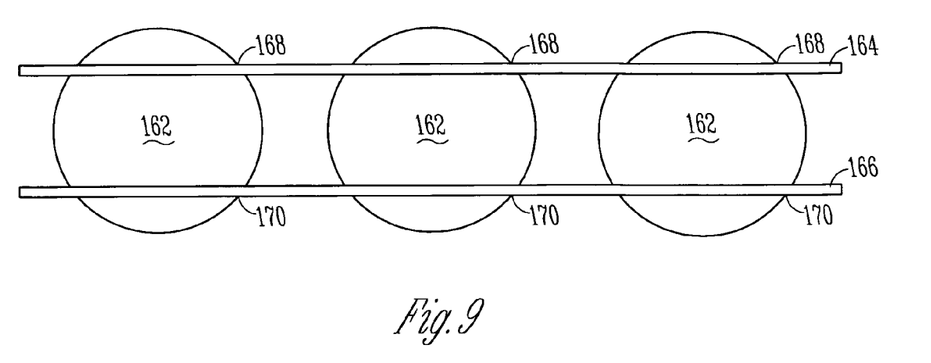
FIG. 9 is a side view of one embodiment of an apparatus for mounting and aligning an array of ball lenses.

Referring to FIG. 9, an apparatus 160 for mounting and aligning an array of ball lenses 162 for use in a display device in accordance with one embodiment of the invention includes a first plate 164 and a second plate 166. Plate 164 has an array of circular holes 168 formed therein (e.g., by drilling) and plate 166 has an array of circular holes 170 formed therein (e.g., by drilling). The diameters of holes 168 and 170 is less than the diameter of each ball lens 162 so that, when lenses 162 are sandwiched between plates 164 and 166, lenses 162 are held by plates 164 and 166. In one embodiment, the diameter of holes 168 is equal to the diameter of holes 170. In another embodiment, the diameter of holes 168 is less than or greater than the diameter of holes 170. The diameter of holes 168 and 170 is large enough to provide a sufficiently bright image on the display. The spacing of holes 168 in plate 164, and of holes 170 in plate 166, is configured to provide spacing of lenses 162 which is appropriate for the particular configuration of the display device.

In one embodiment, mounting and alignment apparatus 160 is formed by providing plate 166, placing ball lenses 162 on top of plate 166, shaking plate 166 until the ball lenses 162 have fallen into holes 170 in plate 166, and then placing plate 164 on top of lenses 162. In this manner, ball lenses 162 are conveniently and inexpensively mounted and aligned.

Figure 10:
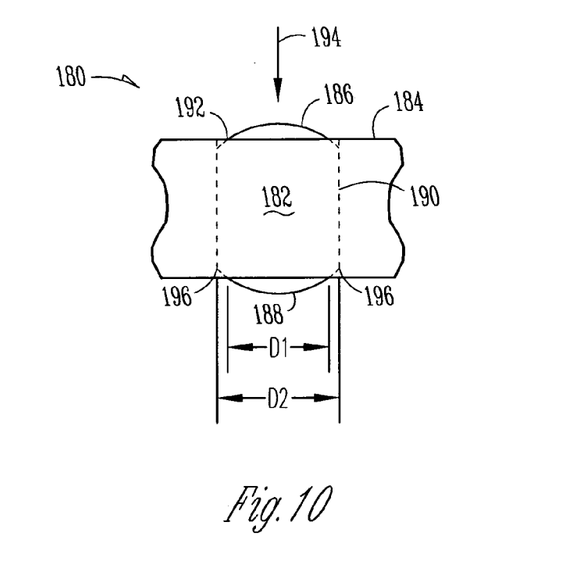
FIG. 10 is a side view of another embodiment of an apparatus for mounting and aligning an array of ball lenses.

Referring to FIG. 10, another apparatus 180 for mounting and aligning an array of cylindrical ball lenses 182 (only one shown) for use in a display device in accordance with one embodiment of the invention includes a plate 184. Lenses 182 have a spherical top 186, a spherical bottom 188 and a cylindrical middle portion 190. Lenses 182 may be formed, for example, by taking a core from a spherical ball. Plate 184 has a thickness on the order of, but less than, the diameter of lenses 182 (i.e., the distance from top 186 to bottom 188). Plate 184 has an array of holes 192 (only one shown) formed therein (e.g., by drilling). Each hole 192 is formed by drilling a first bore having a diameter D1 less than the diameter of cylindrical middle portion 190 completely through plate 184, and then drilling a second bore having a diameter D2 slightly greater than the diameter of cylindrical middle portion 190 partially through plate 184 in direction 194 so as to leave an abutment 196 of plate 184 in hole 192 (e.g., by drilling the second bore only 90% through plate 184). Then, lens 182 is placed into hole 192 until bottom 188 comes into contact with abutment 196. At this point, spherical bottom 188 extends outwardly from the bottom of plate 184, and spherical top 186 extends outwardly from the top of plate 184. In one embodiment, an adhesive secures lens 182 in hole 192. In another embodiment, a thin plate (not shown) having an array of holes having a diameter less than the diameter of cylindrical middle portion 190 is mounted to the top of plate 184 to secure lenses 182 within plate 184. Thus, cylindrical ball lenses 182 are conveniently and inexpensively mounted and aligned.

In another embodiment, the sides of a cylindrical ball lens are shaped inwardly from the spherical top and bottom of the lens towards the midpoint of the middle portion (e.g., similar to a core of an apple that has been eaten around the circumference). The middle portion is painted black to provide a cylindrical ball lens having an aperture in the center.

Conclusion

The above description is intended to be illustrative, and not restrictive. Many other embodiments will be apparent to those of skill in the art. For example, a tiled display system in accordance with the present invention may include different size arrays of display devices, each display device may be subdivided into different numbers of sections, and different optical systems may be used to project each sectional image onto the screen. The amount of magnification and/or shifting provided by the optical systems may also be different, as may the size of the dead-bands between sections and/or gaps between display devices. The scope of the invention should therefore be determined with reference to the appended claims, along with the full scope of equivalents to which such claims are entitled.

What is claimed is:

1. A tiled display apparatus, comprising:
a plurality of display devices, wherein each display device is subdivided into a plurality of sections with each section separately configured to display a sectional image, each display device including a dead-band region between each pair of adjacent sections;
a screen; and
a plurality of lens assemblies, wherein each lens assembly is optically coupled to a corresponding one of the sections of each of the display devices to project the sectional image displayed on that section onto the screen, and the plurality of lens assemblies are configured to merge the projected sectional images to form a single tiled image, at least one lens assembly is configured to provide magnification having a magnitude of greater than 1 such that the respective projected sectional image on the screen is larger than the corresponding sectional image on the display device, wherein the lens assemblies provide magnification to merge adjacent projected sectional images together to eliminate the dead-band regions from the tiled image, at least one lens assembly being configured to provide a shift so the respective projected sectional image on the screen is shifted sideways with respect to an axis normal to the corresponding sectional image.

2. The apparatus of claim 1, wherein each display device comprises a flat-panel display (FPD).

3. The apparatus of claim 2, wherein each display device comprises a liquid-crystal display (LCD).

4. The apparatus of claim 1, wherein each display device comprises a non-FPD.

5. The apparatus of claim 4, wherein each display device is selected from the group consisting of a cathode ray tube (CRT) display and a projection display.

6. The apparatus of claim 1, wherein the screen comprises a rear projection screen having a rear side and a front side, and wherein the sectional images are projected onto the rear side and the tiled image is viewable from the front side.

7. The apparatus of claim 1, wherein each of the lens assemblies includes a projection lens for projecting the respective sectional image onto the screen.

8. The apparatus of claim 7, wherein each projection lens is symmetric.

9. The apparatus of claim 8, wherein each projection lens includes a doublet of identical lenses.

10. The apparatus of claim 8, wherein each projection lens includes a triplet of lenses.

11. The apparatus of claim 8, wherein each projection lens includes a ball lens.

12. The apparatus of claim 7, wherein each lens assembly also includes a field lens for focusing the respective sectional image onto the respective projection lens.

13. The apparatus of claim 12, wherein the projection lens of each lens assembly has an optical axis and the field lens of each lens assembly has the same optical axis.

14. The apparatus of claim 12, wherein the projection lens of each lens assembly has a first optical axis, the field lens of each lens assembly has a second optical axis, and the first and the second optical axis of at least one lens assembly are different.

15. The apparatus of claim 1, wherein each lens assembly includes a plastic lens.

16. The apparatus of claim 15, wherein the plurality of lens assemblies includes an array of plastic lenses for projecting an array of sectional images onto the screen.

17. The apparatus of claim 1, wherein adjacent display devices are separated by a gap, and at least one lens assembly adjacent to the gap is configured to shift the respective projected sectional image sideways with respect to the normal axis and towards the gap so as to eliminate at least part of the gap from the tiled image.

18. The apparatus of claim 17, wherein both of the lens assemblies adjacent to the gap are configured to shift the respective projected sectional images sideways towards each other so as to eliminate the gap from the tiled image.

19. The apparatus of claim 1, further comprising a plurality of backlight assemblies, each backlight assembly optically coupled to one of the display devices.

20. The apparatus of claim 19, wherein each backlight assembly provides a plurality of backlight channels, and each backlight channel is configured to provide a separate backlight for one of the sections of the corresponding display device.

21. The apparatus of claim 20, wherein each backlight channel includes a condenser for concentrating light received from a light source onto the section.

22. The apparatus of claim 20, wherein each backlight channel includes a fiber bundle for communicating light received from a light source onto the section.

23. The apparatus of claim 20, wherein each backlight channel includes a tapered light pipe for communicating light from a light source onto the section.

24. The apparatus of claim 1, further comprising means for distortion control.

25. A method of generating a tiled display, comprising the steps of:
providing a plurality of display devices;

subdividing each of the display devices into a plurality of separate display sections such that there is a dead-band region between each pair of adjacent sections on each display device;

displaying a sectional image on each section of each display device; and projecting the sectional image displayed on each section of each display device onto a screen with the projected sectional images merged into a tiled image, wherein projecting the sectional image displayed on each section includes magnifying at least one of the sectional images such that the respective projected sectional image on the screen is larger than the corresponding sectional image on the display device and magnifying adjacent sectional images on either side of the dead-band regions to eliminate the dead-band regions from the tiled images the projecting step includes shifting at least one of the projected sectional images sideways on the screen with respect to an axis normal to the corresponding sectional image.

26. The method of claim 25, wherein the projecting step includes focusing the respective sectional image onto a projection lens for projecting the sectional image.

27. The method of claim 25, wherein the projecting step includes projecting an array of sectional images onto the screen using an array of plastic projection lenses.

28. The method of claim 25, wherein the providing step includes defining a gap separating adjacent display devices, and the projecting step includes shifting at least one projected sectional image adjacent to the gap sideways with respect to the axis and towards the gap so as to eliminate at least part of the gap from the tiled image.

29. The method of claim 28, wherein the projecting step includes shifting a pair of projected sectional images adjacent to the gap sideways towards each other so as to eliminate the gap from the tiled image.

30. The method of claim 25, further comprising optically coupling a backlight to each of the sections of each of the display devices.

31. An apparatus for generating a tiled display, comprising:

a plurality of display devices;

a screen;

means for subdividing each display device into a plurality of separate display sections such that each display device includes a dead-band region between each pair of adjacent sections;

means for displaying a sectional image on each section of each display device; and means for projecting the sectional image displayed on each section of each display device onto the screen with the projected images merged into a tiled image, the projecting means including means for magnifying at least one of the sectional images so the projected sectional image on the screen is larger than the corresponding sectional image on the display device, and wherein the projecting means includes means for magnifying adjacent sectional images to merge adjacent projected sectional images together to eliminate the dead-band regions from the tiled image, the projecting means including means for shifting at least one of the projected sectional images sideways on the screen with respect to an axis normal to the corresponding sectional image on the display device.

* * * * *